(No Model.)
M. A., W. C. & R. L. RANDOLPH.
COMBINED GANG PLOW AND CULTIVATOR.
No. 498,697. Patented May 30, 1893.
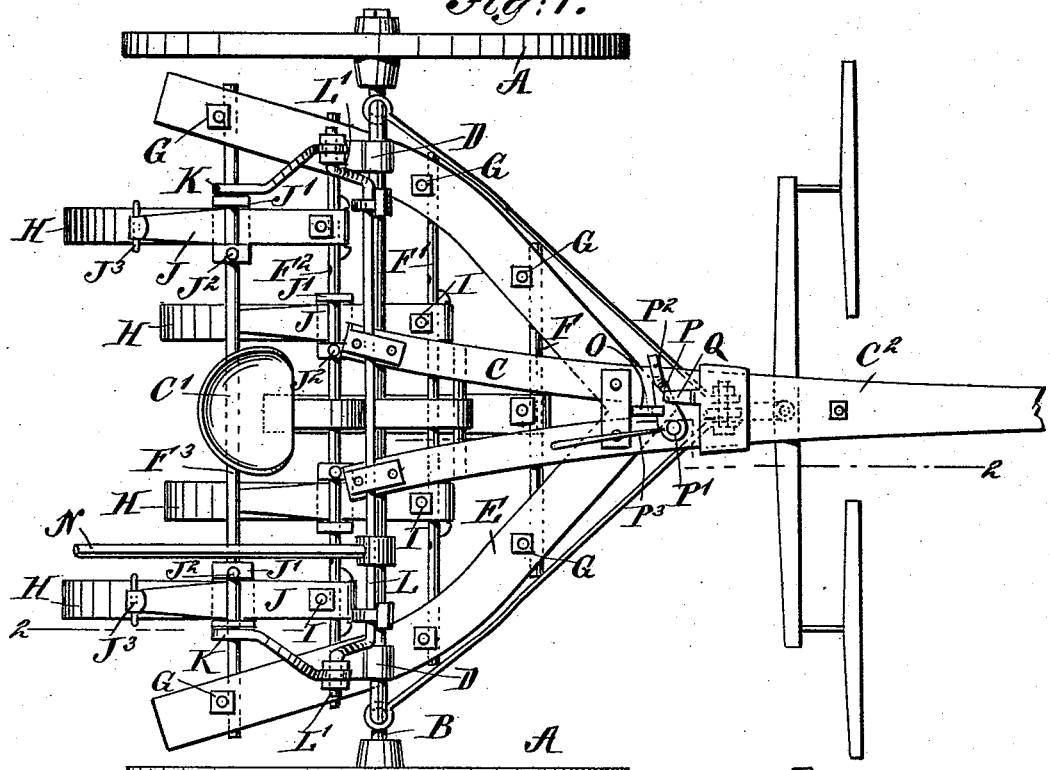
WITNESSES:
Chas. Viola
C. Sedgwick
INVENTORS
M. A. Randolph
W. C. Randolph
R. L. Randolph
BY Munn & Co
ATTORNEYS.

UNITED STATES PATENT OFFICE.

MADISON A. RANDOLPH, WILLIAM C. RANDOLPH, AND ROBERT L. RANDOLPH, OF SUMMERVILLE, MISSOURI.

COMBINED GANG-PLOW AND CULTIVATOR.

SPECIFICATION forming part of Letters Patent No. 498,697, dated May 30, 1893.

Application filed November 7, 1892. Serial No. 451,189. (No model.)

*To all whom it may concern:*

Be it known that we, MADISON ASBERRY RANDOLPH, WILLIAM CISCERO RANDOLPH, and ROBERT LORENZO RANDOLPH, all of Summerville, in the county of Texas and State of Missouri, have invented a new and Improved Combined Gang-Plow and Cultivator, of which the following is a full, clear, and exact description.

The invention relates to agricultural machines, and its object is to provide a new and improved gang plow adapted to be used as a cultivator, which is simple and durable in construction, very effective in operation, arranged for shallow or deep plowing, and adapted to be quickly changed from a gang plow to a cultivator and vice versa.

The invention consists of certain parts and details, and combinations of the same, as will be hereinafter described and then pointed out in the claims.

Reference is to be had to the accompanying drawings forming a part of this specification, in which similar letters of reference indicate corresponding parts in both the figures.

Figure 1 is a plan view of the improvement; and Fig. 2 is a sectional side elevation of the same on the line 2—2 of Fig. 1.

The wheeled vehicle is provided with the side wheels A mounted to turn on the ends of a U-shaped axle B, clipped or otherwise secured to the vehicle frame C of any approved construction and carrying the seat $C'$ and the usual tongue $C^2$ and doubletree for attaching the animals for drawing the plow.

On the axle B is pivoted the U-shaped plow frame E by means of eyes D attached on top of the said plow frame, as plainly illustrated in Fig. 1.

On the plow frame and at the under side thereof is arranged a series of transversely-extending bars F, $F'$, $F^2$ and $F^3$, secured in place by eye bolts G or other suitable device. The cross bars F, $F'$, $F^2$ and $F^3$ support plows H each formed with a plow point $H'$ formed on a curved bar $H^2$ which terminates in the straight part $H^3$ bent at its forward end at $H^4$ around the respective cross bar F, $F'$, $F^2$ or $F^3$. A bolt I engages this bent part $H^4$ and the straight part $H^3$ in the rear of the respective cross bar so as to fasten the plow in place, it being understood that the bolt I passes through a notch cut at the rear side of the respective cross bar F, $F'$, $F^2$ or $F^3$. Each cross bar is preferably formed with a series of such notches $F^4$ to permit of conveniently adjusting the plow H transversely until the desired position is reached. The bolt I of each plow also engages the forward end of a spring plate J supported in a clip $J'$ secured by a set screw $J^2$ or other means to the next following cross bar $F'$, $F^2$ or $F^3$, as will be readily understood by reference to the drawings. The rear end of the spring plate J carries an eye or loop $J^3$ engaging the straight part $H^3$ of the plow H near the junction with the curved part $H^2$ so that the plow bar is supported at two places from the plow frame E and at the same time is permitted to yield by the action of the spring plate J.

It is understood that the rear or last cross bar $F^3$ only carries the clip $J'$ for supporting the plates J for the last set of plows H supported from the cross bar $F^2$. As illustrated in Fig. 1, the front cross bar F carries a single plow at its middle while the next cross bar $F'$ carries two plows arranged at the sides of the middle plow on the cross bar F, and the next cross bar $F^2$ carries two plows arranged on the outer sides of the previous plows sustained from the cross bar $F'$. Thus when the plows are in engagement with the ground and the machine is pulled forward five furrows are made at the same time. The rear cross bar $F^3$ is pivotally connected by links K with crank arms $L'$ formed on the ends of a shaft L mounted to turn in suitable bearings on the vehicle frame C, directly above the axle D. On this shaft L is secured a handle N under the control of the operator seated in the seat $C'$ so that by moving the handle N upward, the plow points $H'$ of the several plows are lifted and by moving the said handle end downward the plow points are moved to more or less depth into the ground for deep or shallow plowing. When the shaft $F^3$ is rocked its clips $J'$ will rock with it and raise or lower the rear plows through the medium of the plates J and loops $J^3$ and therefore the shaft $F^2$ of the rear plows will also be rocked and its clips $J'$ will act on the next set of plows and plates which will rock the shaft F' which in turn through its clips and the forward plates J will rock the forward shaft J⁴ and raise or lower the plows carried thereby. The plates J have of course a certain amount of longitudinal play or sliding movement through the several clips J' during the operation just described. The forward pointed end of the plow frame E is pivotally connected with an upwardly extending bar O guided in the vehicle frame C and formed at its front edge with teeth O', one of which is adapted to be engaged at a time by a lever P pivoted at P' on top of the vehicle frame C. On this lever P is formed an upwardly-extending projection or handle P² adapted to be engaged by the operator's foot to move the said lever P out of engagement with the respective tooth O' of the bar O. The lever P is also engaged by a spring P³ held on the frame C and serving to move the lever in mesh with the toothed bar O.

To adjust the plow frame E it is simply necessary for the operator to grasp the lever N and release the bar O by pushing the lever P forward with his foot, whereupon the frame E may be rocked by lever N to raise or lower its rear end. The frame E will not drop at its forward end when the bar O is released owing to the fact that the operator has hold of the lever, the frame is hung between its ends on the axle B and the weight of the plows makes the rear end of the frame slightly heavier than the forward end or acts as a counterbalance. As soon as the desired position is reached, the operator releases the pressure on the lever P so that the spring P³ returns the lever P and moves the same in engagement with the toothed bar O to lock the plow frame in place.

The outward swinging motion of the lever P is limited by a suitable stop Q held on the vehicle frame C.

When it is desired to use the gang plow above described, as a cultivator, the operator simply removes the forward plow H attached to the cross bar F so that the other plows straddle the corn or other plant to be cultivated.

It is understood that the plow can be conveniently removed by removing the attaching bolt I and disconnecting the eye J³ from the plow.

Having thus fully described our invention, we claim as new and desire to secure by Letters Patent—

1. The combination with a wheeled axle and tongue connected therewith, of the plow-carrying frame mounted between its ends on the said axle to rock vertically, an adjusting mechanism connecting the forward end of the frame with the tongue, series of vertically swinging plows one in advance of the other and having independent axes, connections between the several series of plows in rear of their axes for simultaneously rocking them and a lever mechanism connected with the rear series, substantially as set forth.

2. The combination with a wheeled axle and a tongue connected therewith of the plow-carrying frame hung between its ends on the axle to rock vertically, a latch mechanism on the tongue, a notched or toothed bar extending upwardly from the front end of the plow frame and engaged by said latch mechanism and a lever mechanism connected with the rear end of the frame for rocking it when said bar is released from the latch mechanism, substantially as set forth.

3. A gang plow or cultivator comprising a wheeled frame, a series of transverse rock shafts mounted thereon the rear one of which is connected with a lever mechanism, the plow or cultivator arms fixedly secured to each succeeding shaft and having a sliding connection with the next shaft to the rear; whereby when the rear shaft is rocked the other shafts will also be rocked through the said plow arms, substantially as set forth.

4. In a device of the class described, the combination with a pivoted plow frame provided with transverse bars, of plows each connected at its forward end with one of the said cross bars, and a spring plate supported from the next following cross bar and connected with the said plow, substantially as shown and described.

5. In a machine of the class described, the combination with a plow frame and transversely-extending bars secured on the said plow frame, of plows each connected at its forward end to one of the said cross bars, a clip attached to the next following cross bar, and a spring plate held at or near its middle on the said clip and connected at its forward end with the forward end of the plow, and a loop or eye held on the rear end of the said spring plate and engaging the shank of the plow at or near its curved part, substantially as shown and described.

MADISON A. RANDOLPH.
WILLIAM C. RANDOLPH.
ROBERT L. RANDOLPH.

Witnesses:
W. J. RANDOLPH,
HARRY P. RATCLIFF.